(12) United States Patent
Robinson et al.

(10) Patent No.: US 8,964,047 B2
(45) Date of Patent: *Feb. 24, 2015

(54) SELF-CORRECTING ADAPTIVE LONG-STARE ELECTRO-OPTICAL SYSTEM

(71) Applicant: Raytheon Company, Waltham, MA (US)

(72) Inventors: Ian S. Robinson, Redondo Beach, CA (US); Mark T. Busch, Palos Verdes Penisula, CA (US); Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,500

(22) Filed: May 28, 2013

(65) Prior Publication Data

US 2013/0335565 A1 Dec. 19, 2013

Related U.S. Application Data

(63) Continuation of application No. 12/425,188, filed on Apr. 16, 2009, now Pat. No. 8,471,915.

(51) Int. Cl.
*H04N 5/228* (2006.01)
*G06T 3/00* (2006.01)
*H04N 5/232* (2006.01)
*H04N 5/14* (2006.01)

(52) U.S. Cl.
CPC .............. *H04N 5/23267* (2013.01); *G06T 3/00* (2013.01); *H04N 5/23287* (2013.01); *H04N 5/144* (2013.01); *H04N 5/23248* (2013.01)
USPC .................... 348/208.5; 348/208.1; 348/208.4

(58) Field of Classification Search
None
See application file for complete search history.

(56) References Cited

U.S. PATENT DOCUMENTS

| 4,805,998 A | 2/1989 | Chen et al. |
| 4,834,517 A | 5/1989 | Cook |

(Continued)

FOREIGN PATENT DOCUMENTS

| EP | 0656725 A1 | 6/1995 |
| EP | 0917103 A2 | 5/1999 |
| WO | 2006/051525 A1 | 5/2006 |

OTHER PUBLICATIONS

EPC 94(3) Search Report dated May 17, 2011 of EP Application No. 10152966.7 filed Feb. 8, 2010 (4 pages).

(Continued)

*Primary Examiner* — Twyler Haskins
*Assistant Examiner* — Angel L Garces-Rivera
(74) *Attorney, Agent, or Firm* — Burns & Levinson LLP; Joseph M. Maraia; Weber Hsiao

(57) ABSTRACT

An imaging platform minimizes image distortion when there is relative motion of the imaging platform with respect to the scene being imaged where the imaging platform may be particularly susceptible to distortion when it is configured with a wide field of view or high angular rate of movement, or when performing long-stares at a given scene (e.g., for nighttime and low-light imaging.) Distortion correction may be performed by predicting distortion due to the relative motion of the imaging platform, determining optical transformations to prevent the distortion, dynamically adjusting the optics of the imaging platform during exposure, and performing digital image correction.

14 Claims, 20 Drawing Sheets

(56) References Cited

U.S. PATENT DOCUMENTS

| | | | |
|---|---|---|---|
| 5,550,672 | A | 8/1996 | Cook |
| 6,977,777 | B1 | 12/2005 | Wick |
| 7,567,731 | B2 | 7/2009 | McDowall et al. |
| 8,150,250 | B2 | 4/2012 | Saito et al. |
| 2001/0012059 | A1 | 8/2001 | Kudo |
| 2006/0187323 | A1 | 8/2006 | Kobayashi et al. |
| 2008/0001066 | A1 | 1/2008 | Ax et al. |
| 2008/0158371 | A1 | 7/2008 | Trescott |
| 2009/0225165 | A1 | 9/2009 | Reneker et al. |
| 2010/0100835 | A1 | 4/2010 | Klaric et al. |
| 2010/0245965 | A1 | 9/2010 | Cook |

OTHER PUBLICATIONS

Vdovin et al., "Micromachined Membrane Deformable Mirrors for Space Applications", Eurosensors XIV, Aug. 27-30, 2000, Copenhagen, Denmark, pp. 309-310.

Bagwell et al., "Adaptive Optical Zoom Sensor", Sandia Report, SAND2005-7208, Sandia National Laboratories, Nov. 2005, pp. 1-35.

Vdovin et al., "Micromachined Mirror with a Variable Focal Distance", EOS Tech Digest, Apr. 1-3, 1996, Engelberg, Switzerland, pp. 28-29.

EP Search Report and Opinion dated Jun. 7, 2010 of EP Application No. 10152966.7 filed Feb. 8, 2010 (8 pages).

Liu et al., "Realization of Image Smear Compensation for Multi-Airborne Digital Camera System", Medical Imaging Paralellel Processing of Images, and Optimization Techniques, SPIE Digital Library, vol. MIPPR 2007, No. 6789 (2007).

Guo et al, "Image Rotation Modeling for Two-dimensional Plane Mirror Scanning and Its Application in Precise Image Positioning for Linear Sensor Imager on Geostationary Platform", Society of Photo-Optical Instrumentation Engineers, SPIE, Journal of Applied Remoted Sensing, vol. 1, No. 013524 (2007).

Chen et al., "Image Stabilization Using Motion Estimation and Micro-mechanical Compensation", Image and Signal Processing, Congress on CISP '08, pp. 578-582 (2008).

Lucke et al., "Hardware Image Motion Compensation for a Scanning, Space-borne Sensor", Infrared Physics, vol. 30, No. 2, pp. 121-141 (1990).

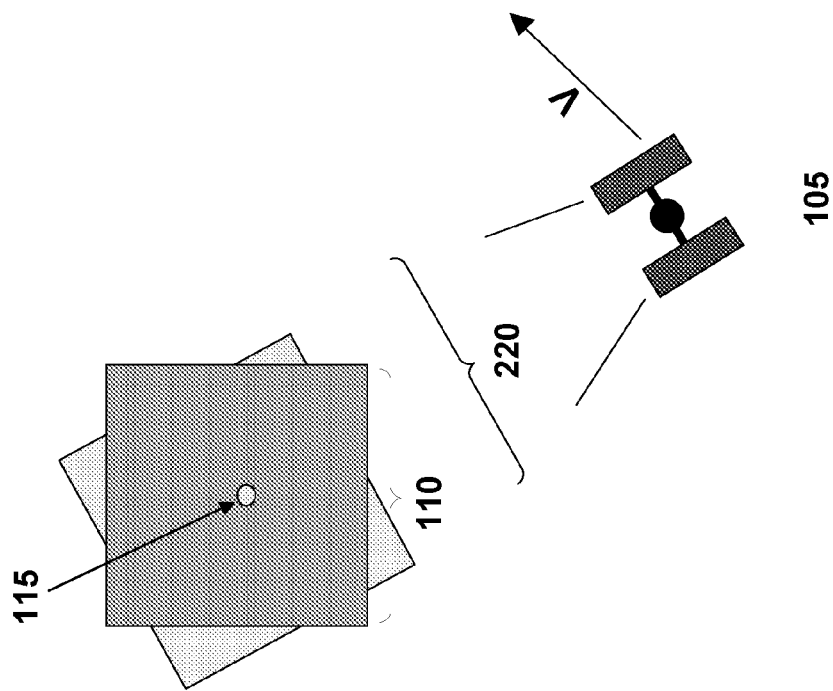
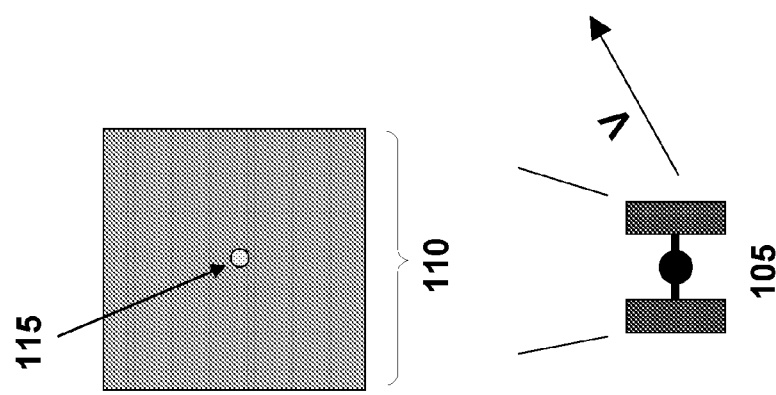

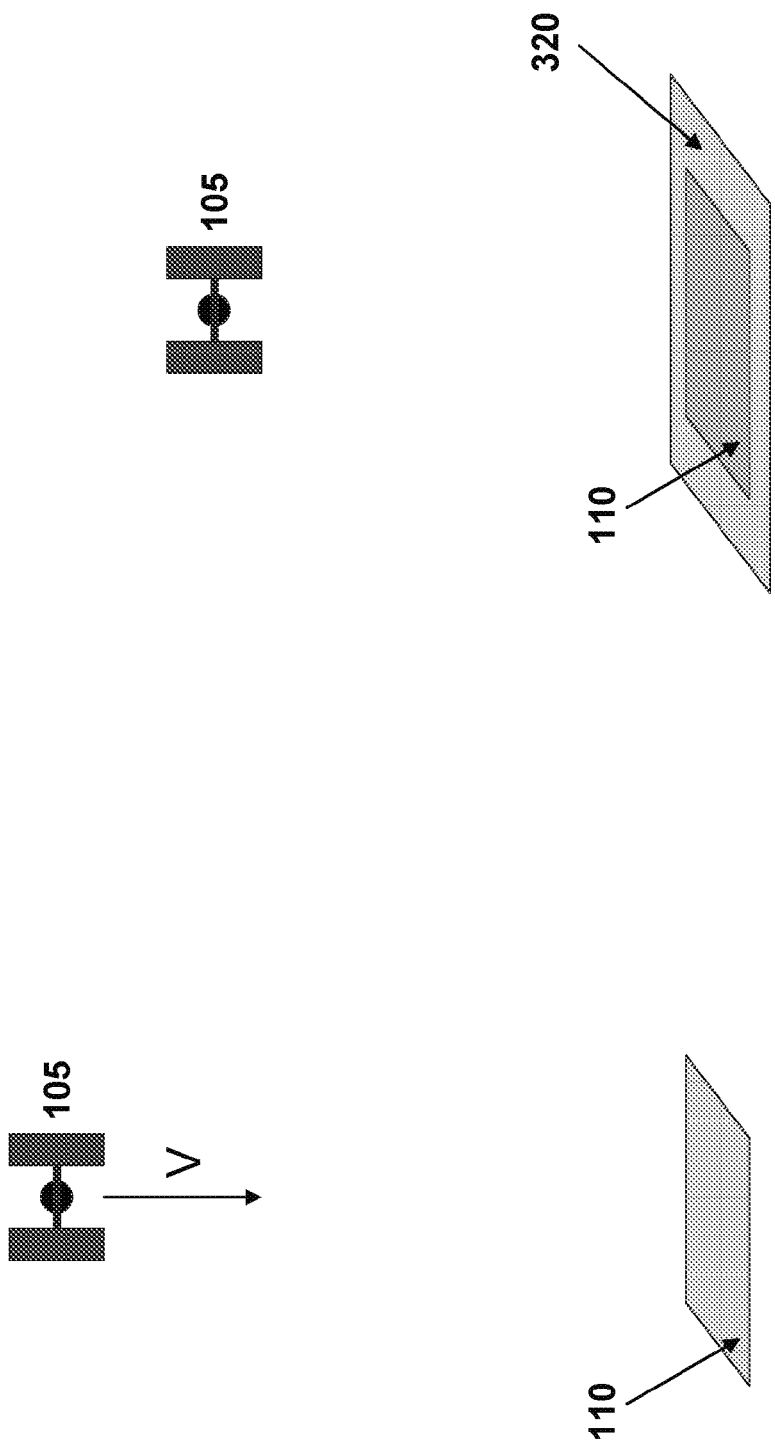

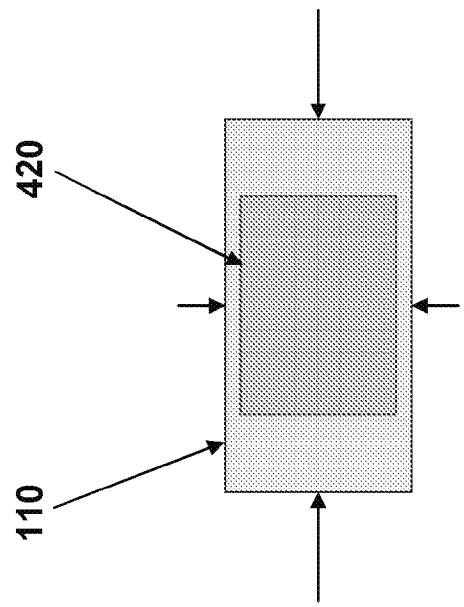
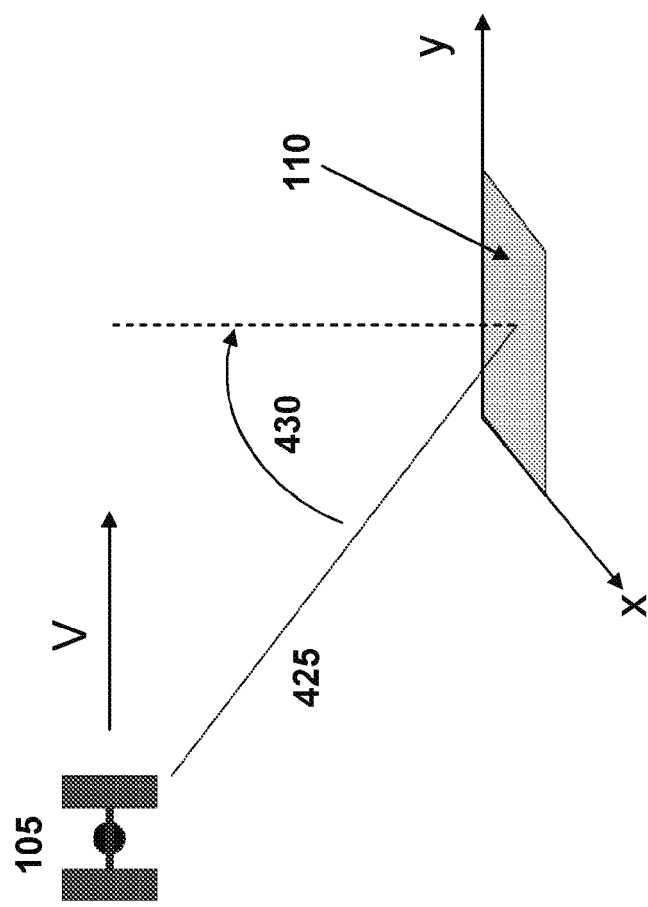
Fig. 4B
Fig. 4A

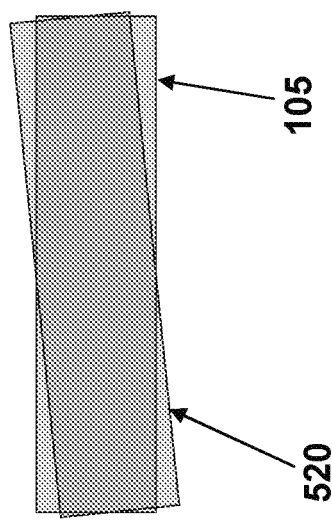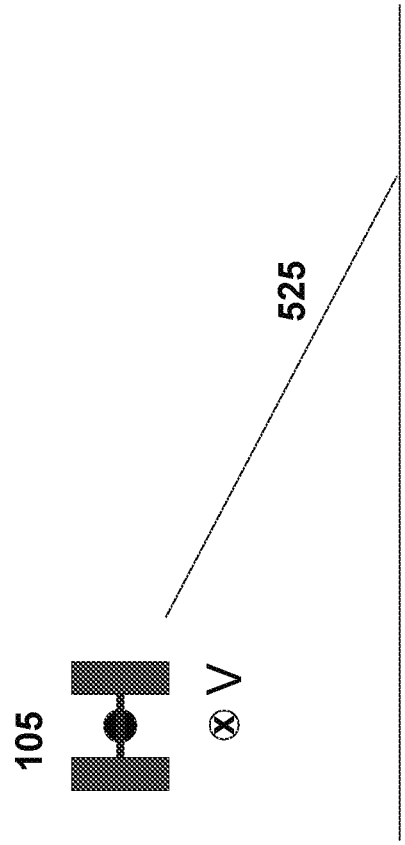

SELF-CORRECTING ADAPTIVE LONG-STARE ELECTRO-OPTICAL SYSTEM

RELATED APPLICATION

This application is a continuation of U.S. application Ser. No. 12/425,188, filed Apr. 16, 2009. The entire teachings of the above application are incorporated herein by reference.

BACKGROUND

It is often desirable to image scenes, or subjects within a scene, when there is relative motion between the subject and the imaging platform. A short exposure period may be used when motion is present so that the subject appears stationary for the duration of the exposure. However, underexposure and loss of contrast in the image may result. Alternatively, if longer exposure periods are used, motion induced distortion may cause the image to blur. As a result, for example, staring time (i.e., exposure period) of space platforms may be limited to approximately 100 ms.

It may also be possible to increase the size of the aperture of the imaging platform in order to capture more light and enable use of a shorter exposure period. However, the cost of some imaging platforms (e.g., airborne and space platforms) can scale geometrically with aperture size. As a result, users may not be able to afford imagery of the necessary quality.

An imaging platform having improved image quality is desired. For example, an imaging platform is desired which can correct distortion caused by relative motion between the imaging platform and the scene, thereby enabling longer stare times. Further, an imaging platform is desired which can enhance the quality of captured images in applications which are particularly susceptible to distortion, e.g., imaging platforms having a wide field of view and/or high angular rates of movement with respect to the ground, and low-light and nighttime imaging platforms.

SUMMARY

According to various embodiments, an imaging platform can minimize image distortion (e.g., blurring) when there is relative motion of the imaging platform with respect to the scene. In particular, airborne and low-orbit space platforms used for ground imaging, for example, tend to be sensitive to motion due to their wide fields of view and/or high angular rates of movement. In addition, nighttime and low-light imaging platforms are susceptible to distortion since longer exposure periods for collecting light are required. By minimizing image distortion due to motion, the exposure period can be increased to reduce underexposure and loss of contrast without causing blur. Further, an imaging platform can utilize a smaller aperture, thus reducing weight, volume, and cost.

Distortion due to changes in viewing geometry (e.g., range, elevation angle, azimuthal angle, rotation etc.) in an individual exposure or in a plurality of sub-frame exposures can be compensated for by dynamically adjusting optics of the imaging platform. Optical compensation can be performed in real time and may increase staring time by a factor of 10-100× (i.e., 1-10 seconds), depending on the angular extent of the field of view (FOV). Additionally, a plurality of sub-frame exposures may be captured and combined into a composite image of higher quality, since more light may be received over the total duration of the sub-frame exposures.

In various embodiments, the imaging platform may comprise a variety of sensors including staring imaging sensors, imaging Fourier transform spectrometers, instruments with two or more angles of view (such as a stereo viewing system), very wide field line scanners, and long dwell Overhead Non-Imaging Infrared (ONIR) and missile warning sensors.

In an embodiment, a system is configured to capture images and comprises an imaging platform configured to capture an image of a scene during an exposure period; a distortion prediction processor configured to determine transformations to prevent or correct image distortion caused by relative motion between the scene and the imaging platform, and to determine residual transformations to correct residual image distortion; a controller configured to control an optical element based on the transformations to compensate for the image distortion; and a digital correction processor configured to digitally process the image to compensate for the residual image distortion.

In another embodiment, a method for capturing images comprises capturing an image of a scene during an exposure period with an imaging platform; determining transformations to prevent image distortion caused by relative motion between the scene and the imaging platform; controlling an optical element based on the transformations to compensate for the image distortion; determining residual transformations to correct residual image distortion; and digitally processing the image to compensate for the residual image distortion.

According to further embodiments, the transformations may be determined based upon the relative motion, viewing geometry, and exposure period of the imaging platform; the image distortion is determined based on a topographical model; a set of optical transformations representing optical adjustments which the imaging platform is capable of performing are determined; a best fit of the transformations to minimize the image distortion are determined; the transformations include rotation and anamorphic focal length transformations; the controller continuously adjusts the optical element during an exposure period to maintain an approximately constant alignment between the scene and the imaging platform; a plurality of images captured during the exposure period are combined into a composite image; the image distortion between a plurality of images captured are analyzed to determine height, elevation, or three-dimensional information associated with the scene; and a moving average of a plurality of images captured is calculated.

These and other features and advantages of the system and method will be apparent from this disclosure. It is to be understood that the summary, drawings, and detailed description are not restrictive of the scope of the inventive concept described herein.

BRIEF DESCRIPTION OF THE DRAWINGS

FIG. 2A shows an imaging platform and its initial field of view about a staring point;

FIG. 2B shows a subsequent field of view due to rotation of the imaging platform about the staring point;

FIG. 3A shows an imaging platform and its initial field of view;

FIG. 3B shows a change in scale of a subsequent field of view of the imaging platform due to movement of the imaging platform directly toward the area being imaged;

FIG. 4A shows an imaging platform as both its altitude and angle from the zenith is reduced;

FIG. 4B shows a subsequent field of view scaled in both the X and Y-directions due to the reduction in altitude and zenith angle;

FIG. 5A shows an imaging platform as it approaches the reader in a direction perpendicular to the plane of the page;

FIG. 5B shows a subsequent field of view due to skew;

DETAILED DESCRIPTION

Figure 1B:
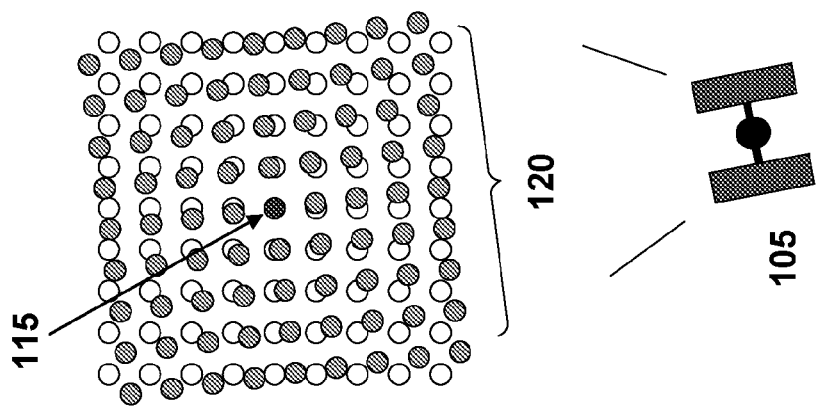
FIG. 1B shows distortion between the initial field of view and a subsequent field of view.
Figure 1A:
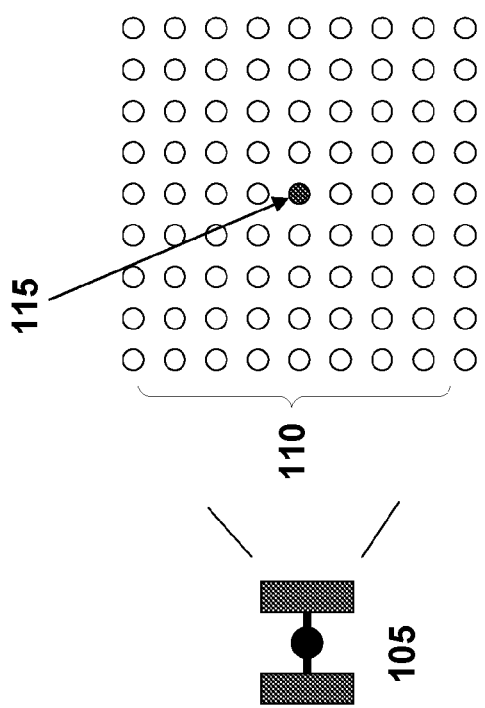
FIG. 1A shows an imaging platform and its initial field of view.

FIG. 1A shows imaging platform 105, having initial field of view 110, capturing images while gazing at staring point 115. An initial image is sensed at initial detector points (e.g., pixels) (shown as open circles). However, during exposure the field of view of imaging platform 105 may change due to relative movement between the scene and imaging platform 105.

FIG. 1B shows that due to the motion of imaging platform 105 a subsequent field of view 120 is not coextensive with initial field of view 110 at a later time in the exposure, or at the time of a later image capture. For instance, while it is possible to align staring point 115, the detector points (shown as darkened circles) are shifted with respect to the initial detector points. As a result, an image, or a composite image formed by combining an initial exposure and a subsequent exposure, may be blurred.

FIGS. 2A-5C show examples of physical motions which may cause image distortion. FIG. 2A, for example, shows initial field of view 110 as imaging platform 105 rotates about staring point 115 with velocity V. FIG. 2B shows a rotational distortion of subsequent field of view 220 due to the rotation.

FIG. 3A shows initial field of view 110 as the altitude of imaging platform 105 is reduced. FIG. 3B shows a scale distortion of subsequent field of view 320. In this example, the change in scale is equal in both the horizontal and vertical directions since imaging platform 105 moves directly toward field of view 110. However, in general, the change in scale may be different along each axis. Changes in scale of the field of view also result in changes in the mapping of individual image pixels to the scene.

FIG. 4A shows imaging platform 105 approaching both the zenith and the area being imaged. FIG. 4B shows an anamorphic scale distortion of subsequent field of view 420. In particular, subsequent field of view 420 is scaled in both the X and Y directions due to the reduction in altitude of imaging platform 105. Further, subsequent field of view 420 is scaled in the Y-direction more than in the X-direction because line-of-sight 425 remains perpendicular to the X-axis while angle 430 changes with respect to the Y-axis due to the change in zenith angle.

Figure 5C:
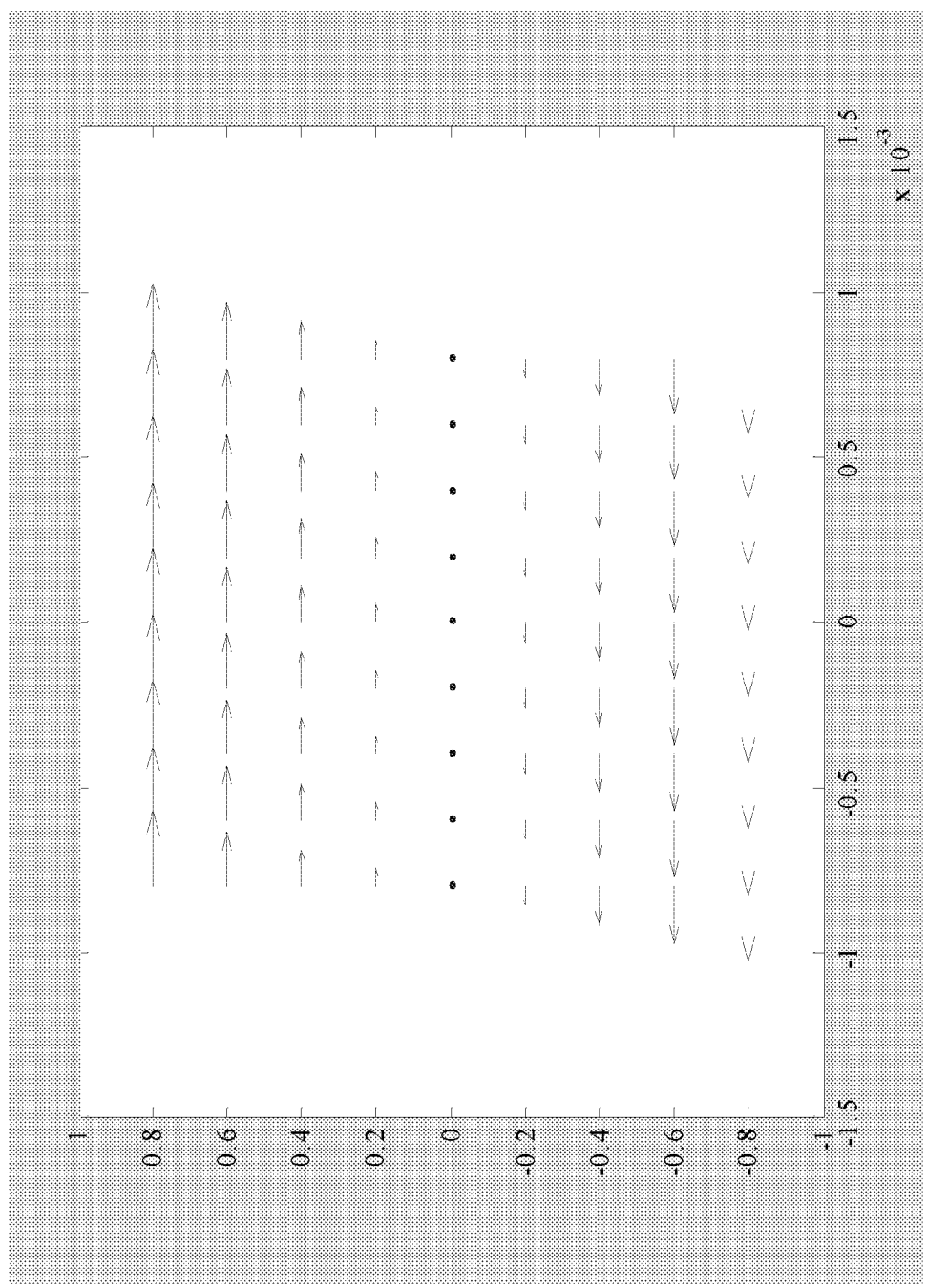
FIG. 5C shows skew depicted as a vector field.

FIG. 5A shows imaging platform 105 having line-of-sight 525 moving with velocity V (i.e., approaches the reader in a direction perpendicular to the plane of the page). FIG. 5B shows initial field of view 105 and subsequent field of view 520 caused by skew distortion. Further, FIG. 5C shows an alternative depiction of skew as a vector field.

Figure 6:
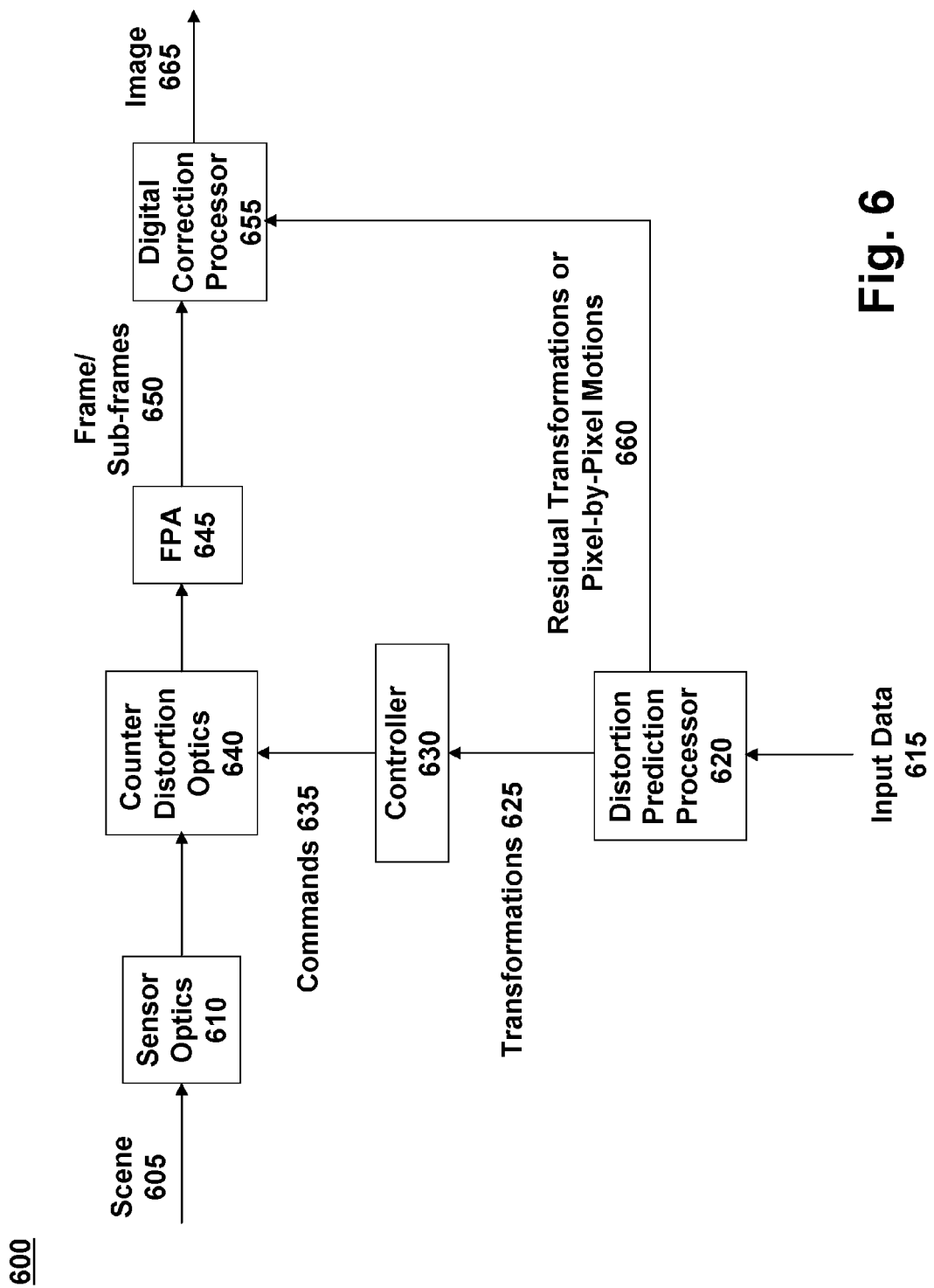
FIG. 6 shows an embodiment of a self-correcting adaptive long-stare electro-optical system.

FIG. 6 shows an embodiment of a Self-Correcting Adaptive Long-Stare Electro-Optical System 600 (SCALES). SCALES 600 captures images of scene 605 via sensor optics 610, which may comprise multiple reflective and/or transmissive lens elements. In an embodiment, imaging platform 105 may be provided with conventional optics 610.

The relative motion between imaging platform 105 and scene 605 can be determined to minimize motion, oscillation, or vibration induced distortions. A variety of sources can provide input data 615 describing the relative motion, viewing geometry, and exposure period of imaging platform 105. For example, imaging platform 105 may have a predetermined ground track for imaging selected terrain. Accordingly, input data 615 may comprise control data specifying the route and/or trajectory of imaging platform 105. Input data 605 can also be provided by sensors, either alone or in combination with control data, to directly detect the motion of imaging platform 105 or the relative motion between imaging platform 105 and scene 605. According to various embodiments, the sensors can include inertial, global positions system (GPS), image processors, etc.).

Distortion prediction processor 620 analyzes input data 615 in order to predict image distortions across a field of view during a stare time. For example, distortion prediction processor 620 can calculate the difference between the field of view of scene 605 at the start and at the end of each exposure period. According to various embodiments, the exposure period and the size of the field of view of imaging platform 105 may be considered in determining distortion since the degree of distortion is approximately proportional to these factors.

Distortion prediction processor 620 can also adjust its predictions according to various models describing the topography of scene 605. For example, distortion prediction processor 620 can utilize planar, spherical, or oblate earth models, relief or topographic models, 3D models of man-made objects, and/or terrain elevation maps. For example, in one embodiment, imaging platform 105 may use a WGS-84 oblate Earth model.

After determining the nature and degree of distortion, distortion prediction processor 620 can determine a set of separable "Eigen" transformations which mathematically describe the distortions. Each Eigen function is directly translatable into an optical adjustment for preventing the image distortion. According to various embodiments, the Eigen transformations may comprise six or fewer separable transformations and/or may include Zernike polynomials.

For example, the Eigen transformations may comprise rotation, zoom, anamorphic stretch in azimuth (or X-axis of the focal plane assembly), anamorphic stretch at 45° (from X-axis), anamorphic stretch in elevation (Y-axis), and/or anamorphic stretch at −45° (from X-axis). According to various embodiments, additional or alternative transformations may be used. In particular, for example, a space platform may use rotation, anamorphic stretch in azimuth, zoom, and anamorphic stretch at 45° (from X-axis) to correct distortion.

To maximize the degree of distortion prevention, the best fit of the transformations can be determined according to various methods. For example, the best fit may be calculated using mean-square error (MSE) over the field of view, a measure of error over a portion of the field of view, or by minimizing the maximum error.

After the best fits are determined, transformations 625 are converted into commands 635 to control counter distortion optics 640. Commands 635 indicate the optical adjustments which must be implemented to correct for the distortion.

According to various embodiments, controller 630 can continuously vary counter distortion optics 640 during an exposure period. For example, counter distortion optics 640 may continuously rotate scene 605 and/or change the effective focal length of imaging platform 105 along one or more axes. They can include, for example, one or more zoom lenses, variable optics, spatial light modulators, or deformable mirrors. Solid-state actuators and/or Micro-Electro-Mechanical Systems (MEMS) may also be used, rather than motors, to limit the number of moving parts which may be failure prone. Additionally, some transformations (e.g., rotation) can be implemented by reorienting imaging platform 105 itself, rather than (or in addition to) adjusting counter distortion optics 640.

For example, a space platform may suffer primarily from rotational distortion (except for views near the flight path), which may be corrected with optics 640 by implementing a counter rotational transformation 625. The remaining distortions may be modeled as a change in focal length along one or more axes, which may be corrected by changing the focal length of imaging platform 105. For instance, the focal length may be changed by a small fraction (approximately 1% or less) of the total focal length.

Images of scene 605, as modified by distortion prevention optics 640, are focused on focal plane assembly 645. Conventional imaging platforms, in contrast, directly focus scene 605 onto focal plane assembly 645 without compensating for changes in the field of view which occur during an exposure period.

According to an embodiment, focal plane assembly 645 reads out a single frame during each staring time. In a further embodiment multiple sub-frames are read out during each staring time so that additional digital correction and/or comparison may be used to combine the sub-frames. In a further embodiment, multiple sub-frames are outputted by focal plane assembly 645 during each staring time using Fowler sampling or another non-destructive readout method, for example. By combining (e.g., integrating) multiple sub-frames 655, a high-quality composite image 665 can be generated.

Residual distortion remaining after optical correction 640 may be removed by digital correction processor 655. Residual distortion may be present if controller 630 cannot flawlessly adjust counter distortion optics 640, or if imperfections exist for which counter distortion optics 640 cannot correct.

In an embodiment, distortion prevention optics 640 and digital correction processor 655 cooperate to correct distortion and increase the signal-to-noise ratio of frames/sub-frames 650. In an embodiment, the relative proportion of distortion correction provided by counter distortion optics 640 and digital correction processor 655 may vary between 0% and 100%.

To determine the type and degree of digital distortion correction necessary, an error signal is provided to digital correction processor 655. The error signal can comprise residual transformations or pixel-by-pixel motions 660. In particular, the difference between ideal transforms "as commanded" by controller 630 and "as executed" by distortion prevention optics 640 can be indicated by residual transformations 660. Further, the difference between a particular staring "as commanded" and "as executed" can be indicated by pixel-by-pixel motions 660. Accordingly, in an embodiment, the residual distortion in a field of view can be corrected via image processing or by resampling focal plane assembly 645. As a result, distortion in image 665 caused prior to and/or during image capture can be reduced by counter distortion optics 640, and distortion caused during and/or after image capture can be reduced by digital correction processor 655.

According to various embodiments, the processes described can be implemented with a variety of microprocessors and/or software. Further, distortion prediction processor 620 and/or digital correction processor 665 can be implemented off-site of imaging platform 105 (e.g., at a ground location physically separated from imaging platform 105). For example, distortion prediction processor 620 and/or digital correction processor 665 may each be implemented in multiple processors.

Figure 7:
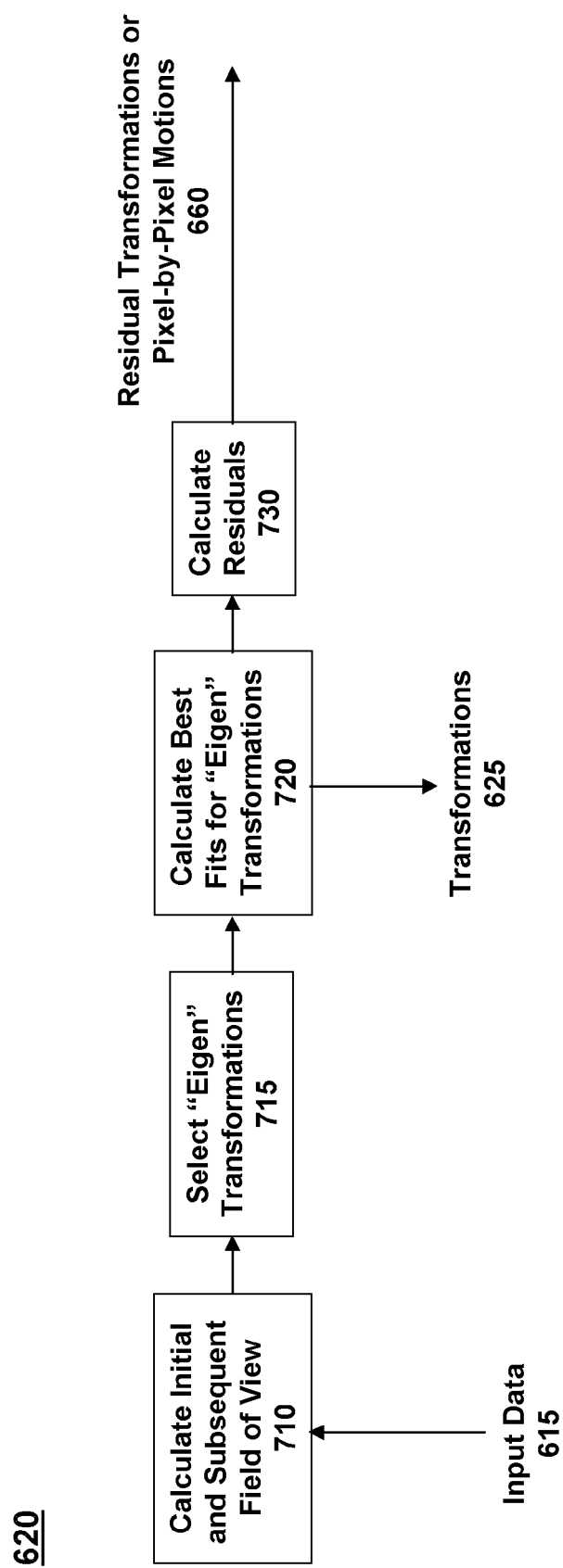
FIG. 7 shows distortion prediction processor according to an embodiment.

FIG. 7 shows an embodiment of distortion prediction processor 620, which can receive input data 615 indicating the relative motion, viewing geometry, and/or exposure period of imaging platform 105. Based on input data 615, image distortion can be predicted by calculating the difference between initial and subsequent fields of view 710 during a stare time. Further, the prediction may be adjusted based on various topographical models.

The distortion between the initial and subsequent fields of view are modeled by transformations 715 (e.g., Eigen transformations). Transformations 715 can describe a set of optical adjustments which are capable of compensating for image distortion and are also implementable by distortion prevention optics 640. In particular, they may comprise rotation, zoom, anamorphic stretch in azimuth (or X-axis of the focal plane assembly), anamorphic stretch at 45° (from X-axis), anamorphic stretch in elevation (Y-axis), and/or anamorphic stretch at −45° (from X-axis). In order to maximize distortion prevention, transformations 715 can be optimized by calculating best fits 720 to minimize mean-square error or the maximum error, for example. After calculating best fits 720, transformations 625 (e.g., Zernike polynomials) describing optical adjustments for correcting image distortion are outputted by distortion prediction processor 620.

In addition, residual error is calculated 730 based on the difference between the ideal distortion correction and the correction actually implemented by distortion prevention optics 640. Residual error can be represented by transformations or pixel-by-pixel motions 660. Common causes of residual error may include inaccuracies in controlling counter distortion optics 640, or higher order aberrations for which counter distortion optics 640 cannot correct.

Figure 8:
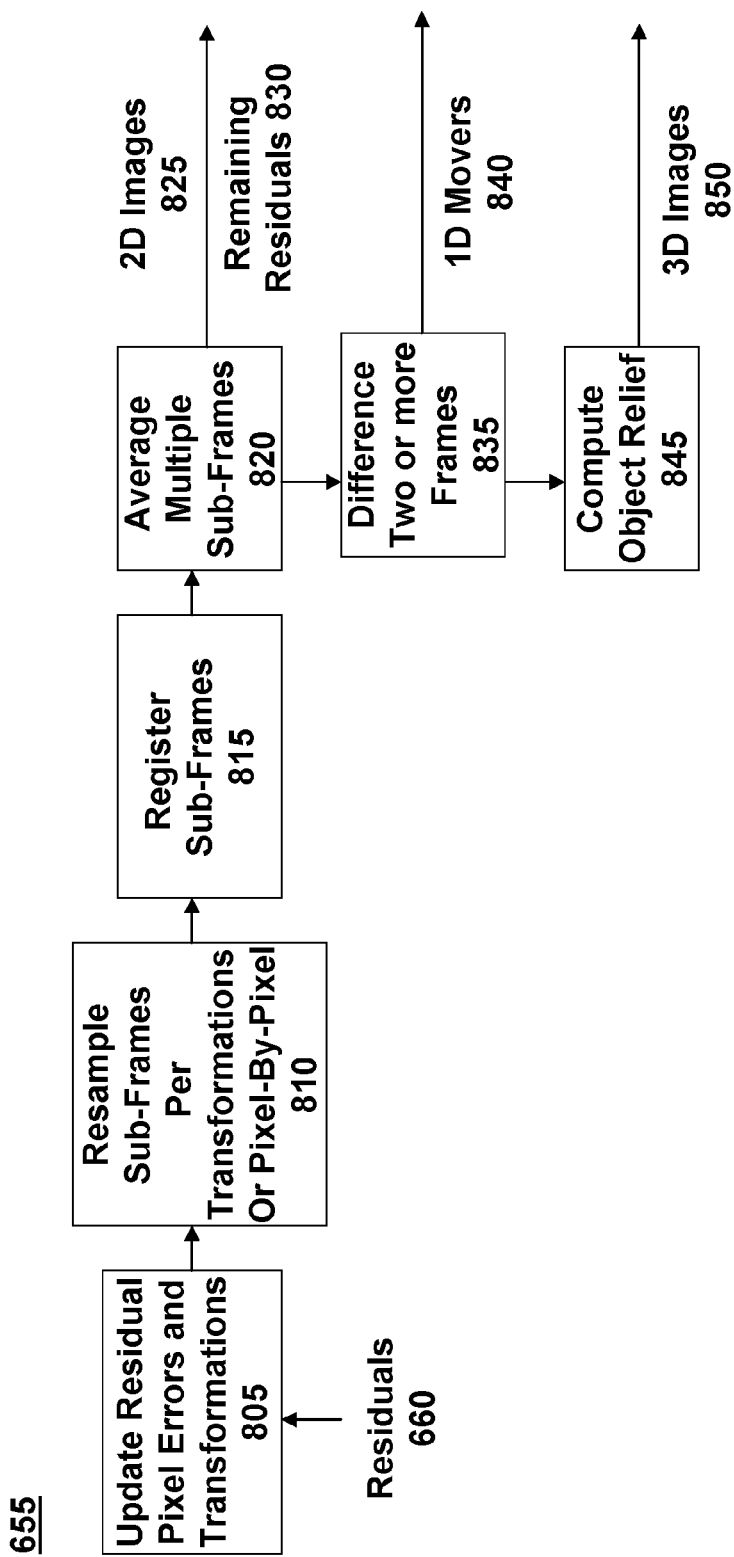
FIG. 8 shows a digital correction processor according to an embodiment.
Figure 9:
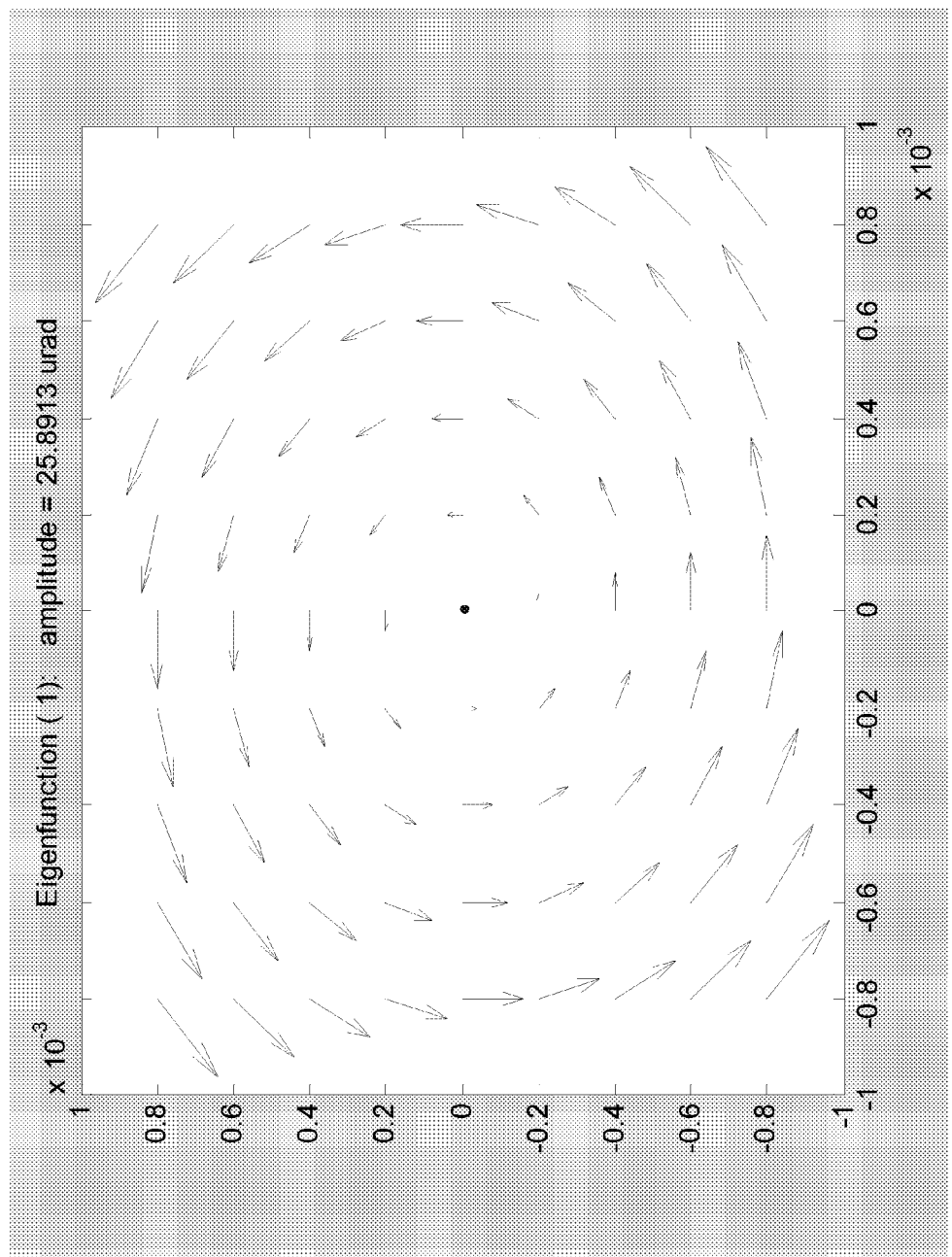
FIG. 9 shows a vector field of an example transformation comprising a rotation.
Figure 10:
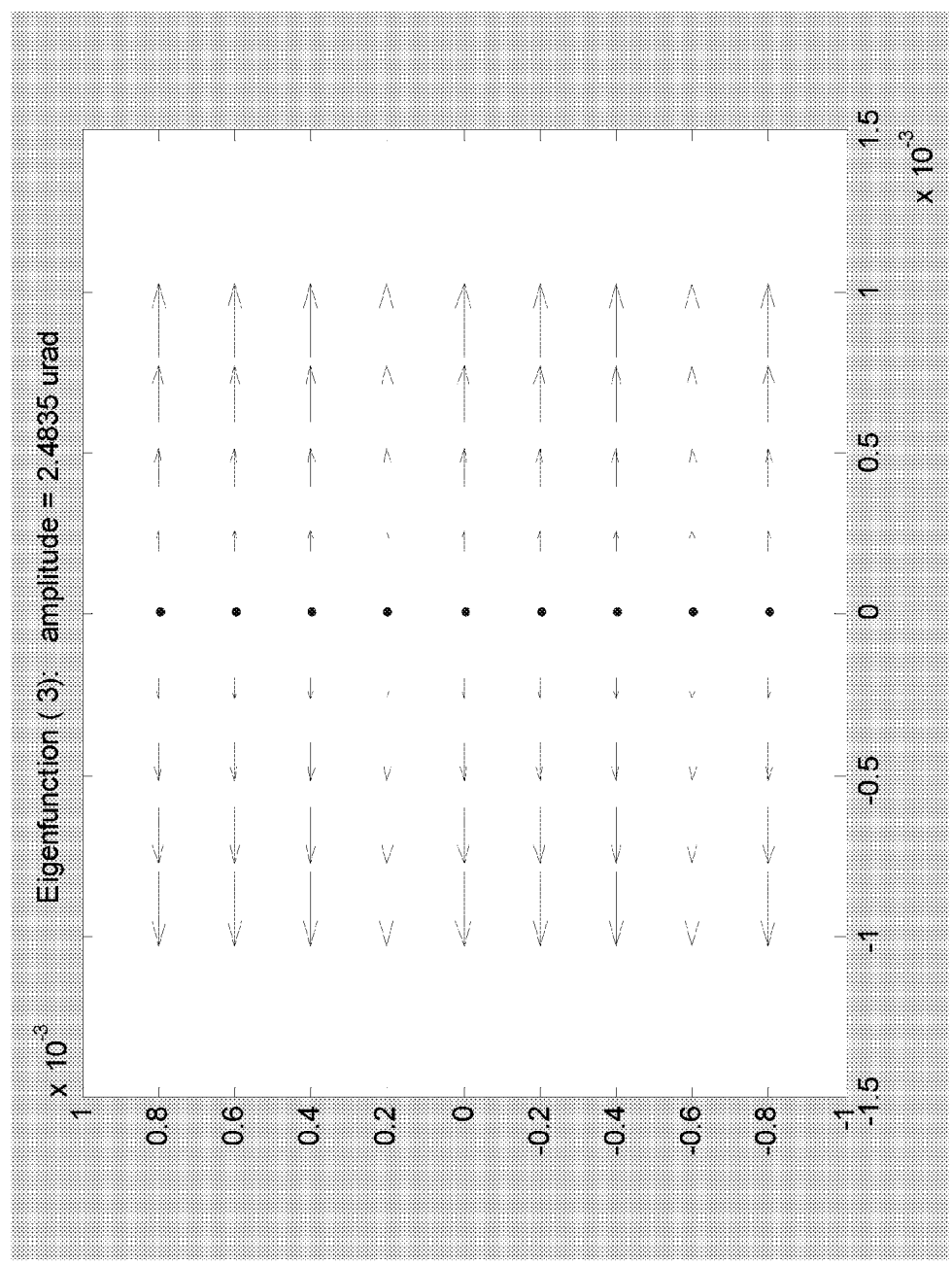
FIG. 10 shows a vector field of an example transformation comprising an anamorphic stretch in the X-direction.
Figure 11:
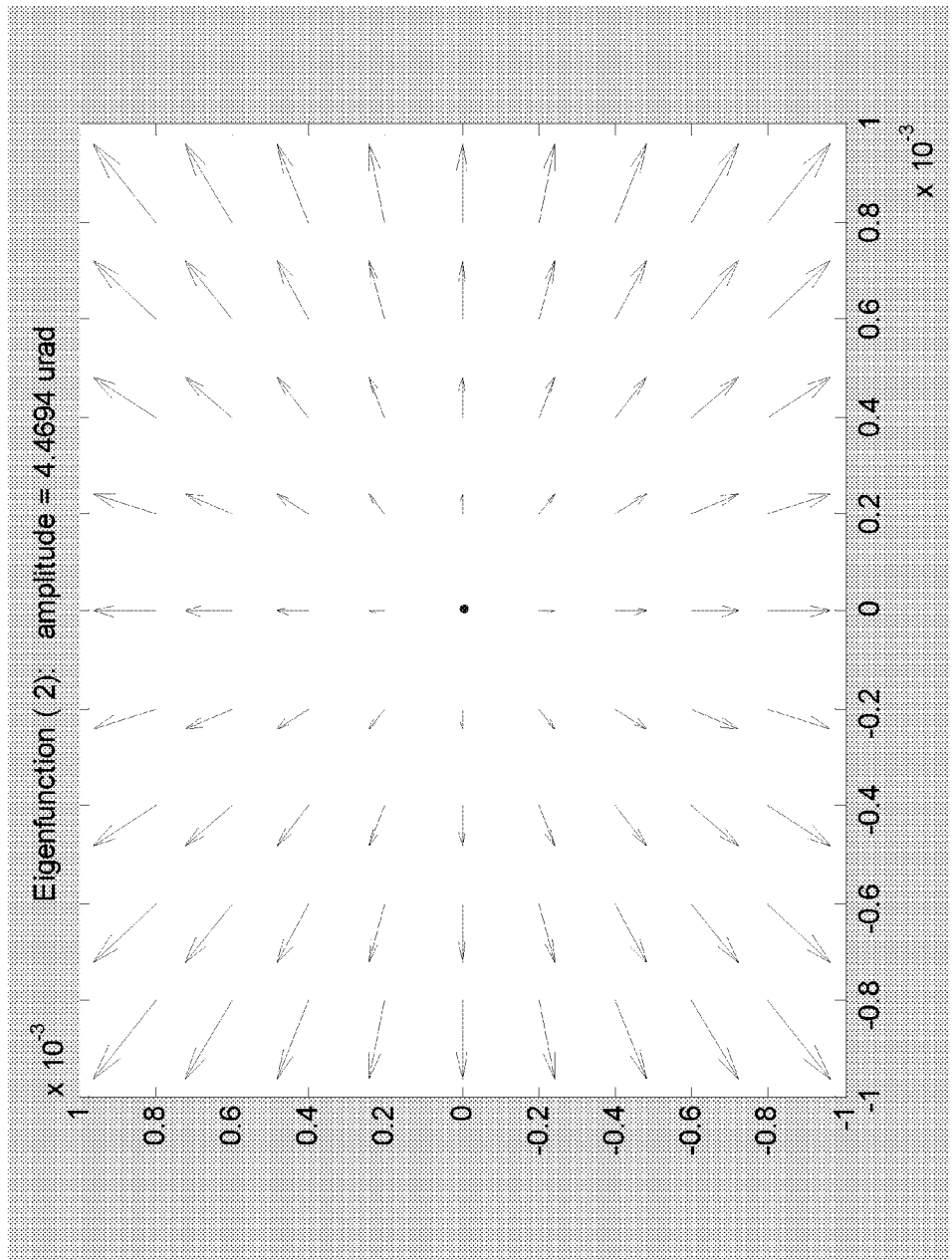
FIG. 11 shows a vector field of an example of a transformation comprising a change in range.
Figure 12:
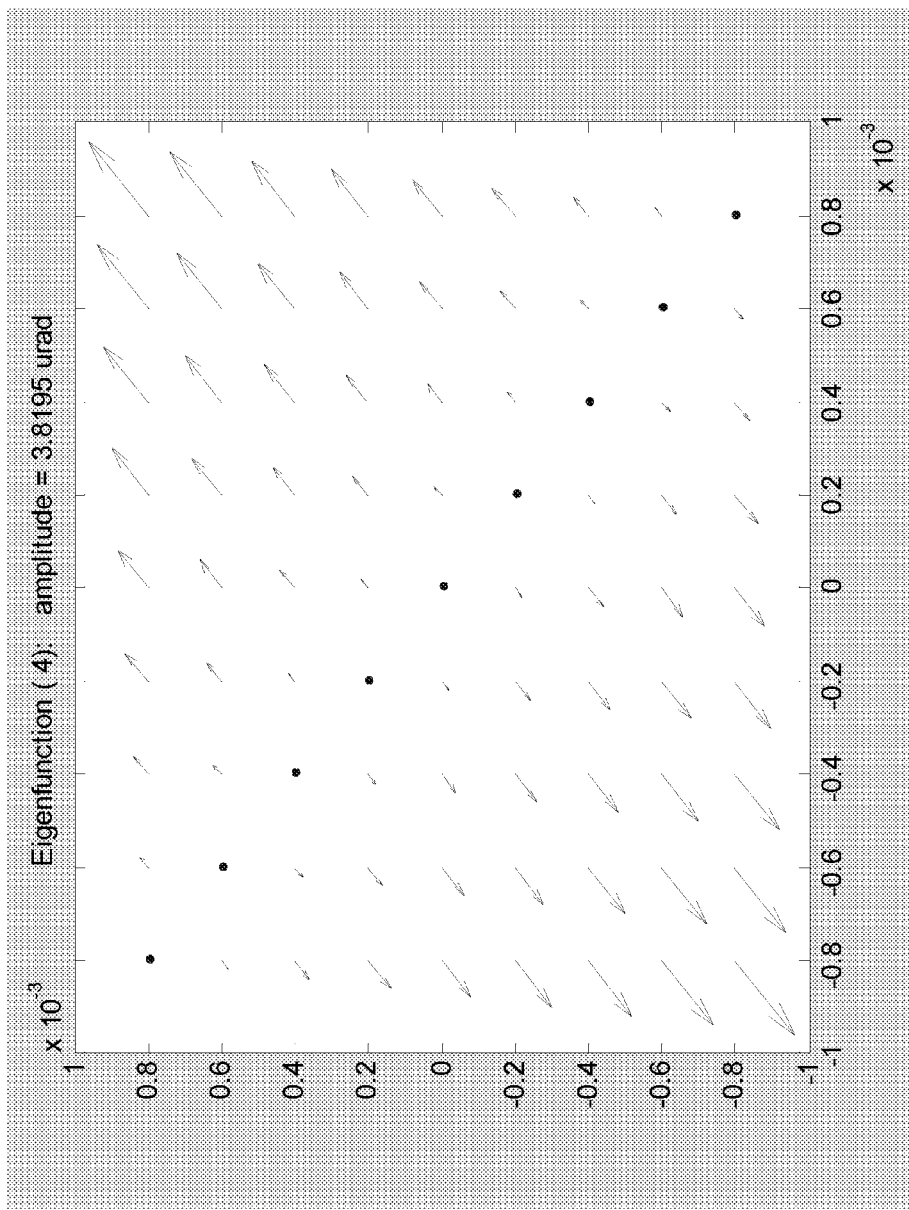
FIG. 12 shows a vector field of an example of a transformation comprising an anamorphic stretch at 45° due to skew.

FIG. 8 shows digital correction processor 620, which can further reduce image distortion using residual error 730. Residual error 660 can be accumulated over time by updating residual pixel errors and/or transformations 805. Block 805 estimates the ideal pixel-by-pixel distortion corrections and compares them to what has been implemented in the distortion prevention optics to determine any residual distortions. Thereafter, sub-frames 650 can be resampled 810 to remove the residual distortions at each pixel. Sub-frames 650, however, may not be aligned such that pixels of scene 605 correspond between frames. Accordingly, registration and warping of sub-frames 650 may be performed to spatially align multiple sub-frames 650.

Sub-frames 650 can be processed in various imaging modes to generate images 665. For example, in an embodiment, multiple sub-frames 650 can be combined into composite image 665 to maximize signal to noise ratio. In particular, a time sequence of composite images 650 can be created by outputting a moving average of sub-frames 650, or sub-frames 650 can be superimposed, to create a higher quality 2D image 825. Any residual errors 830 remaining after optical counter distortion 640 and digital correction 655 may also be outputted for additional distortion correction or image analysis.

In a further embodiment, moving targets 840 may be detected within distortion corrected imagery by determining the difference between multiple frames 835 and detecting pixels and/or edges which move. In addition, object relief can be computed 845 to create 3D images 850 of scene 605 by analyzing apparent pixel movement. For example, a series of images may be captured by imaging platform 105 crossing over a mountain peak. The mountain peak may appear to move between the images (even after distortion correction is performed) due to parallax caused by the elevation of the mountain peak. The apparent motion of the mountain peak can be analyzed to track pixels and edges and to calculate height by using stereo processing techniques.

FIGS. 9-12 show vector fields associated with various transformations for correcting image distortion. In particular, they illustrate rotation, anamorphic stretch in the X-direction, a change in focal length, and anamorphic stretch at 45°, respectively.

Figure 13:
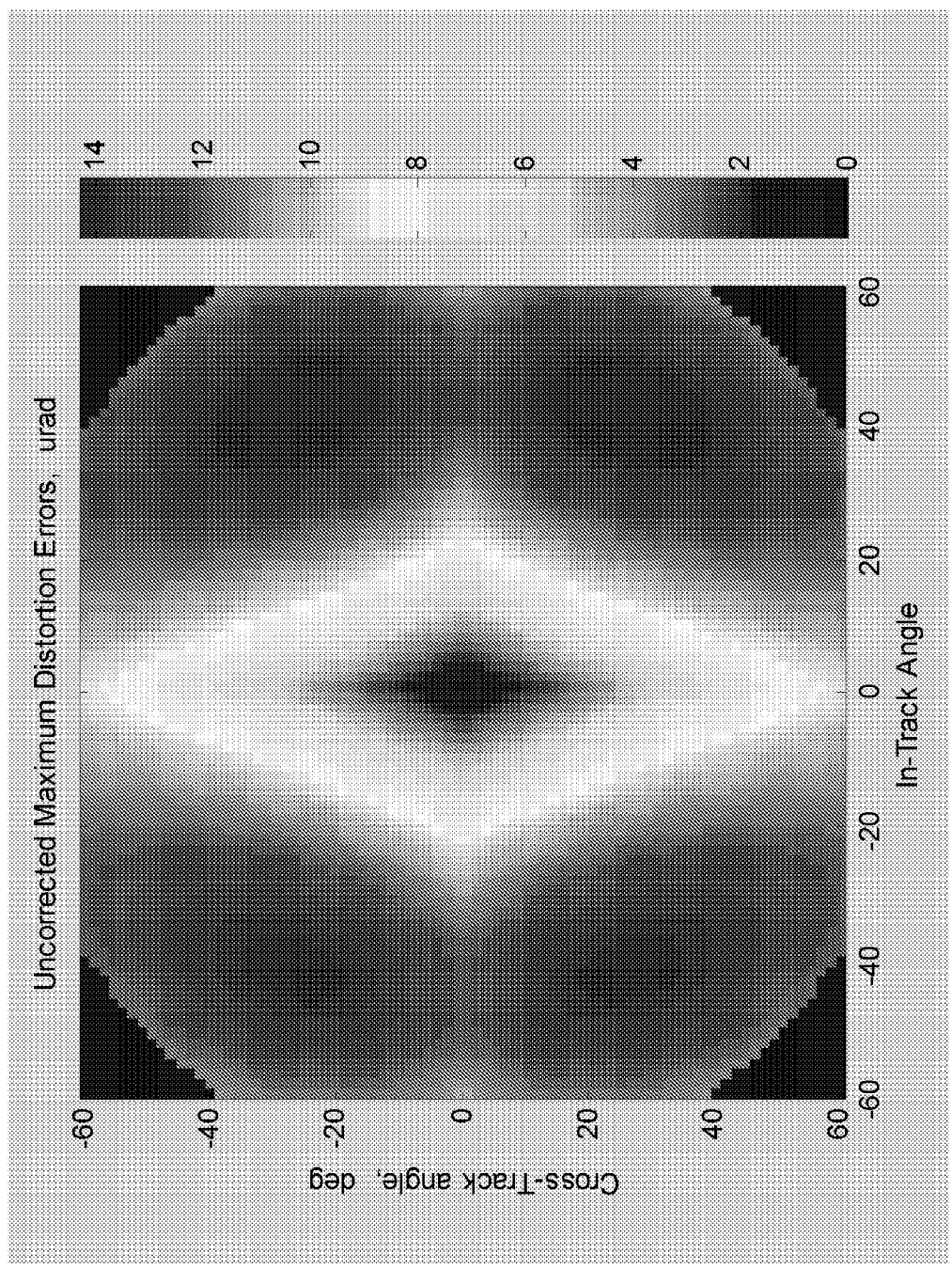
FIG. 13 shows an example of the worst case distortion errors in a field of view from a low earth orbit space platform as a function of its viewing angles (in-track angle and cross-track angle)

FIG. 13 shows an example of the uncorrected maximum distortion errors for imaging platform 105 having a one milliradian field of view at an altitude of 350 km. As can be seen, the distortion is a function of the in-track angle along the direction of movement of imaging platform 105, and the cross-track angle perpendicular to the direction of movement of imaging platform 105. In general, the maximum distortion is relatively low near the origin, but increases for values farther from the origin and the axis.

Figure 14:
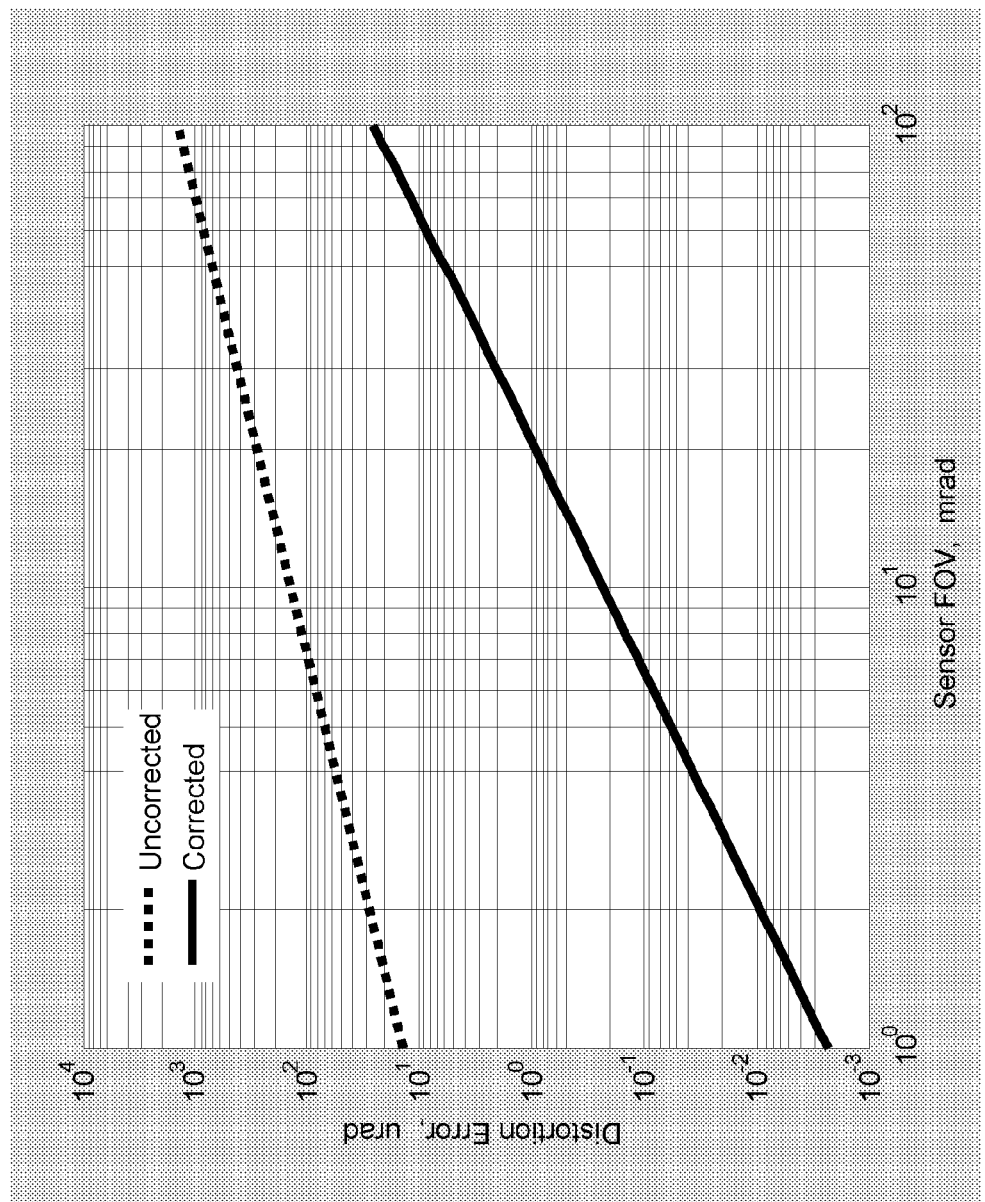
FIG. 14 shows the corrected and uncorrected distortion error as a function of the size of field of view.

FIG. 14 shows an example of corrected and uncorrected distortion as a function of field of view of imaging platform 105 at an altitude of 350 km. As can be seen, distortion increases with larger fields of view.

FIGS. 15-19 show an example of correcting distortion. In this example, four Eigen transformations (i.e., rotation, zoom, anamorphic stretch in x-axis, and anamorphic stretch along 45° are performed. In addition, the best fit for each Eigen transformation is determined by minimizing the mean-square error.

Figure 15:
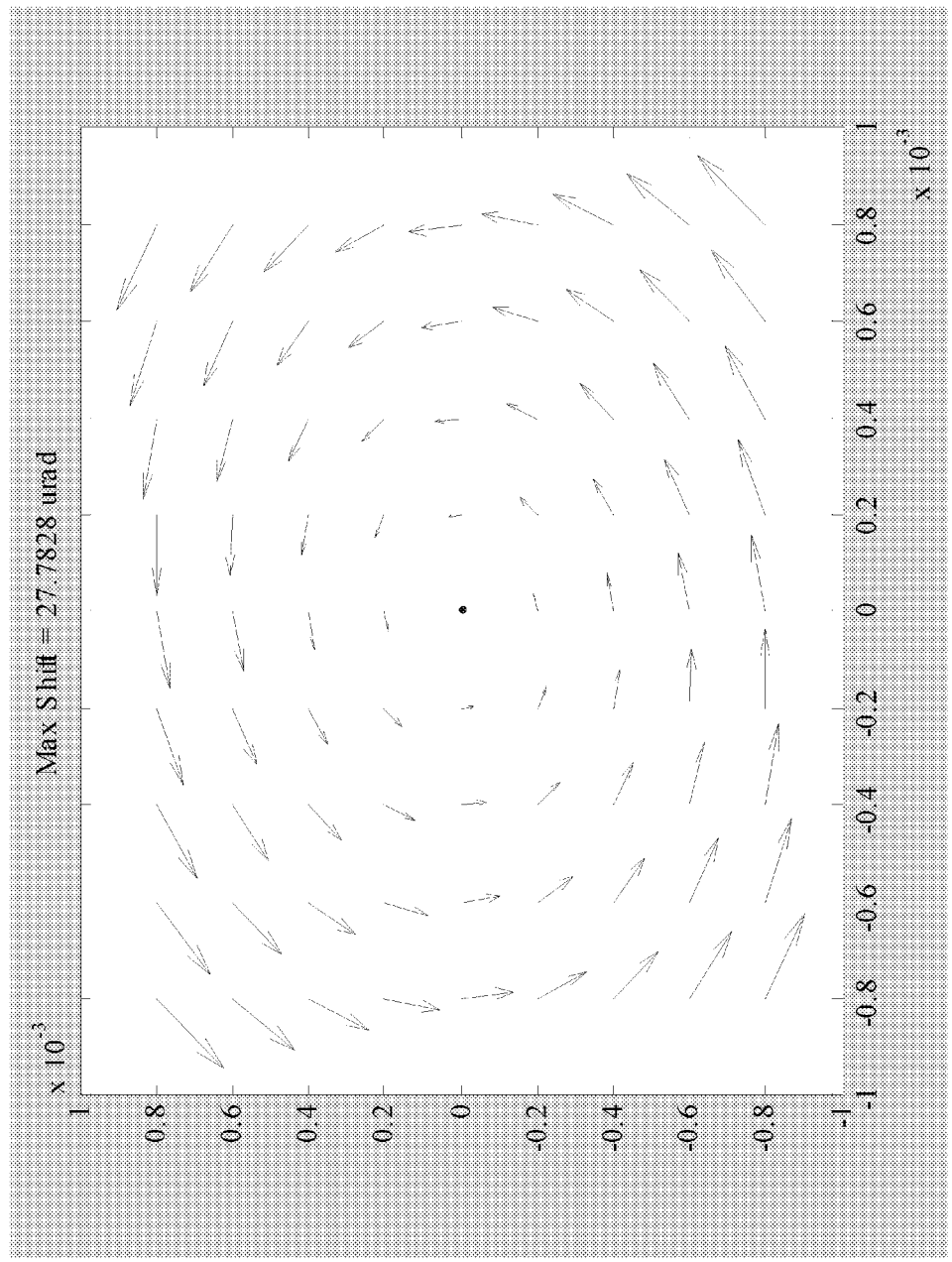
FIG. 15 shows a vector field of the overall distortion of a scene viewed for one second over a field of view of 1.6 mrad from an altitude of 600 km.

FIG. 15, in particular, shows a vector field of the overall direction and magnitude of distortion viewed by imaging platform 105 for one second over a field of view of 1.6 mrad (i.e., approximately one km) from an altitude of 600 km. FIG. 15 also shows that that the maximum distortion or smear is approximately 28 gad per second. A pixel whose subtense is one microradian would smear across 28 pixels in a one second exposure.

According to an embodiment, it may be desirable to limit distortion to a maximum value of one-third of a pixel for an exposure or stare time in order to provide sharp, high-resolution imagery. Thus without distortion prevention, using a focal plane assembly having at least 1000×1000 pixels, the image would be smeared over as many as 17.5 pixels (since each pixel has a field of view of 1.6 μrad) in a 1.0 second exposure. Alternatively, it would be necessary to limit focal plane assembly 645 to about 20×20 pixels or reduce the stare time to under 0.02 seconds (or some intermediate combination thereof) to limit smear to one-third of a pixel. Distortion prevention and correction, therefore, is desirable to enable larger pixel arrays and increased stare time with reduced smear.

Figure 16:
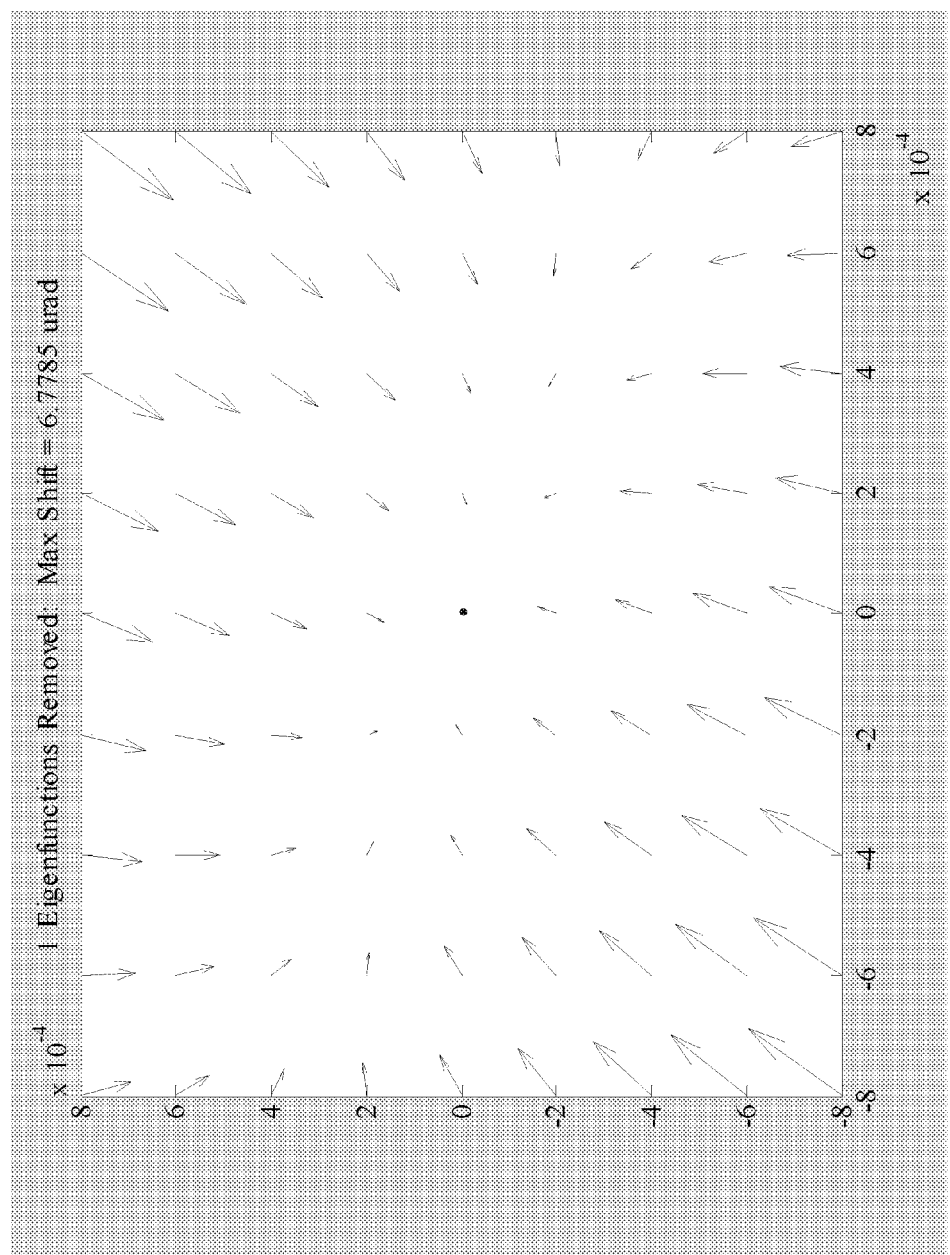
FIG. 16 shows the distortion remaining after correcting for rotation.

FIG. 16 shows the remaining distortion after performing a rotational correction. Removing rotation alone reduces the maximum distortion to approximately 6.8 μrad per second, thus enabling a 400×400 pixels focal plane assembly or a 0.2 second stare time for a one-third pixel maximum level of smear.

Figure 17:
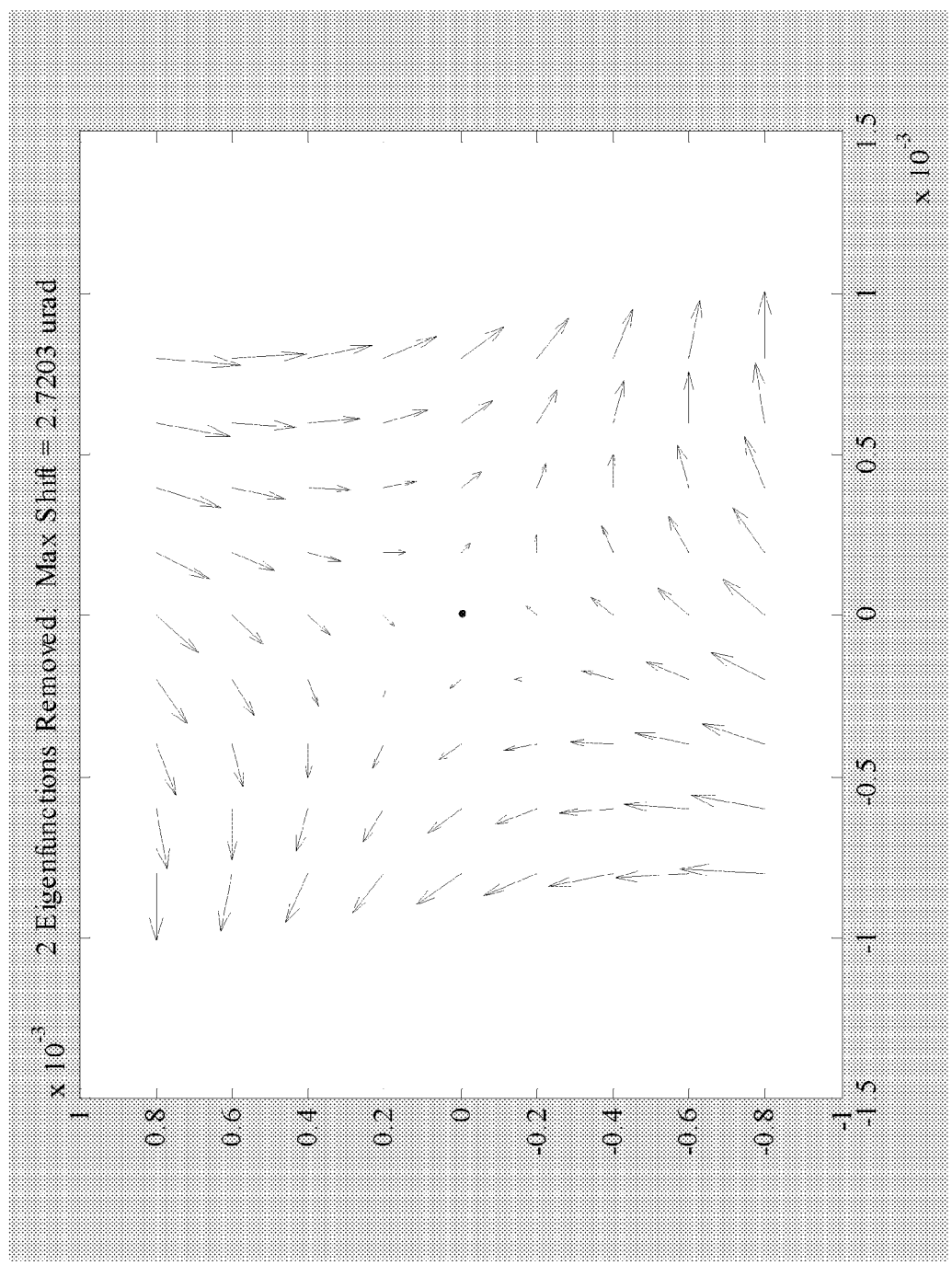
FIG. 17 shows the distortion remaining after correcting for zoom.

FIG. 17 shows the distortion remaining after correcting for zoom. Removing zoom, in addition to rotational distortions, reduces the maximum distortion to approximately 2.7 μrad per second. Thus, it would be possible to use a 1000×1000 pixel focal plane assembly with a stare time of 0.2 seconds.

Figure 18:
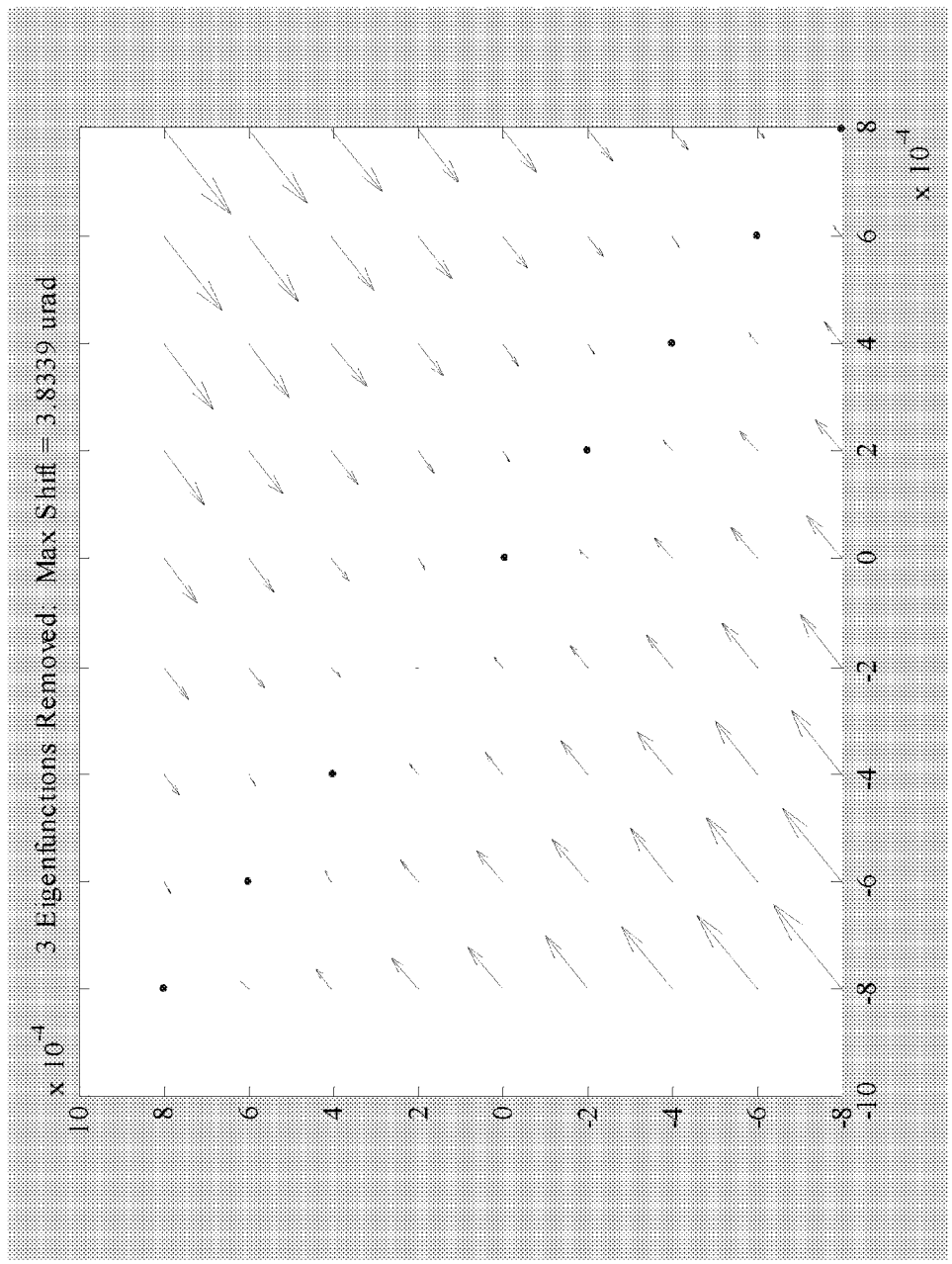
FIG. 18 shows the distortion remaining after correcting for anamorphic stretch along the x-axis.

FIG. 18 shows the distortion remaining after correcting for anamorphic stretch along the x-axis. Removing anamorphic stretch along the x-axis results in a maximum distortion of approximately 3.8 μrad per second. In this example, the worst case distortion increased for a small region of the focal plane, but the average distortion was reduced since the algorithm minimized the average distortion at each stage.

Figure 19:
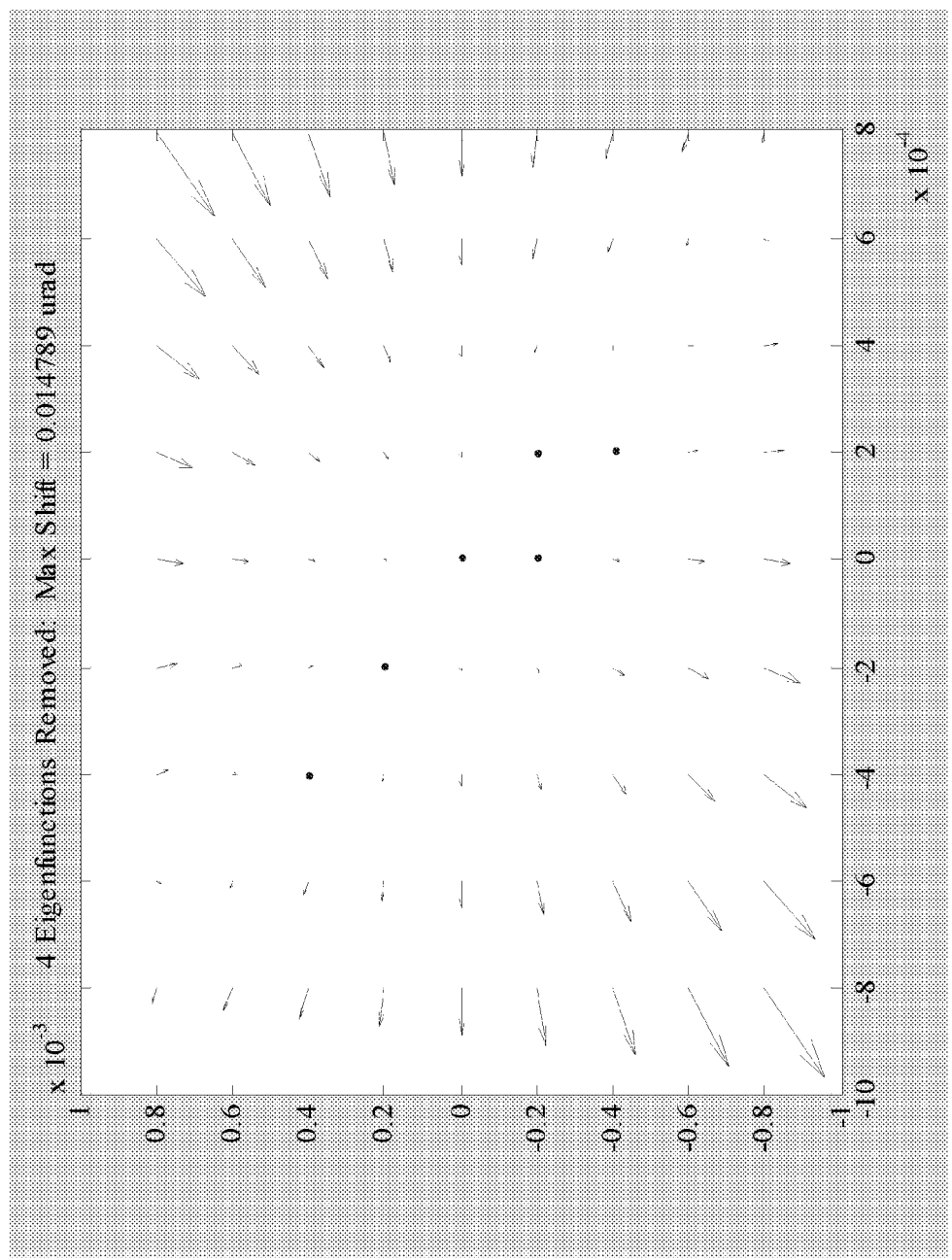
FIG. 19 shows the distortion remaining after correcting for anamorphic stretch at 45°.

FIG. 19 shows the distortion remaining after correcting for anamorphic stretch at 45°. Removing anamorphic stretch at 45° reduces the maximum distortion to approximately 0.015 μrad per second. As a result, even larger focal plane assemblies or much longer stare times can be used when anamorphic stretch along the x-axis and at 45° is removed. According to various embodiments, the imaging platform or user may also select other combinations and sequences of the transformations described with respect to FIGS. 16-19. The longer stare times enable a sensor to collect images when scene radiance is weak (e.g. moonlit areas) or to complete scans that require a stable image (e.g, Fourier Transform Spectrometer).

While particular embodiments of this disclosure have been described, it is understood that modifications will be apparent to those skilled in the art without departing from the spirit of the inventive concept. The scope of the inventive concept is not limited to the specific embodiments described herein. Other embodiments, uses, and advantages will be apparent to those skilled in art from the specification and the practice of the claimed invention.

What is claimed is:

1. A system configured to capture images, comprising:
   an imaging platform configured to capture an image of a scene during an exposure period, the image being represented as a plurality of sub-frames;
   a distortion prediction processor configured to determine transformations to prevent image distortion caused by a relative motion between the scene and the imaging platform, and to determine residual transformations to correct residual image distortion;
   a controller configured to adjust an optical element based on the transformations to prevent the image distortion, the optical element being adjusted during each sub-frame in the plurality of sub-frames; and
   a digital correction processor configured to use the residual transformations to digitally process the plurality of sub-frames to compensate for the residual image distortion, the residual image distortion being different than the image distortion prevented by the optical element.

2. The system of claim 1, wherein the controller is further configured to compensate for motion between sub-frames in the plurality of sub-frames.

3. The system of claim 2, wherein the digital correction processor is further configured to apply a residual transformation to each sub-frame in the plurality of sub-frames and compensate for motion between the sub-frames.

4. The system of claim 3, wherein the digital correction processor is further configured to apply a residual transformation to each sub-frame in the plurality of sub-frames and compensate for translation motion between the sub-frames.

5. The system of claim 1, further comprising a focal plane array (FPA) onto which the image is received, the FPA configured to compute and output a difference frame for each sub-frame in the plurality of sub-frames.

6. The system of claim 5, wherein a plurality of sub-frames outputted by the FPA are difference frames having a dynamic range lower than the scene.

7. The system of claim 6, wherein a sub-frame outputted by the FPA has a dynamic range lower than the scene and adaptively matched to either an associated difference frame or a first sub-frame.

8. A system configured to capture images, comprising:
an imaging platform configured to capture an image of a scene during an exposure period, the image being represented as a plurality of sub-frames;
a distortion prediction processor configured to determine transformations to prevent image distortion caused by a relative motion between the scene and the imaging platform, and to determine residual transformations to correct residual image distortion;
a controller configured to adjust an optical element based on the transformations to prevent the image distortion, the optical element being adjusted once per sub-frame; and
a digital correction processor configured to use the residual transformations to digitally process the plurality of sub-frames to compensate for the residual image distortion, the residual image distortion being different than the image distortion prevented by the optical element.

9. The system of claim 8, wherein the digital correction processor is further configured to apply a residual transformation once per sub-frame.

10. The system of claim 9, wherein the digital correction processor is further configured to apply a residual transformation for two-dimensional translations.

11. The system of claim 10, wherein the digital correction processor is further configured to apply a residual transformation for two-dimensional translations occurring between sub-frames.

12. The system of claim 8, further comprising a focal plane array (FPA) onto which the image is received, the FPA configured to compute and output a difference frame for each sub-frame in the plurality of sub-frames.

13. The system of claim 12, wherein a plurality of sub-frames outputted by the FPA are difference frames having a dynamic range lower than the scene.

14. The system of claim 13, wherein a sub-frame outputted by the FPA has a dynamic range lower than the scene and adaptively matched to either an associated difference frame or a first sub-frame.

* * * * *